Patented Jan. 13, 1948

2,434,412

UNITED STATES PATENT OFFICE 2,434,412

RECOVERING RUBBER FROM GUAYULE SHRUB

Edwin P. Jones, Salinas, Calif., assignor to the United States of America, as represented by the Secretary of Agriculture No Drawing. Application January 15, 1946, Serial No. 641,356

3 Claims. (Cl. 260—821)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to recovery of rubber from guayule shrub, and has among its objects a process whereby a very substantial recovery is effected and the rubber can be recovered immediately after harvesting of the shrub or when it is partially dried, thus to provide economy from the standpoint of recovery as well as from that of operating costs.

According to the prior processes of extracting rubber from guayule shrub, the plant is first "conditioned" by drying, the percentage of moisture being substantially less after conditioning than that contained in freshly harvested shrub. In the dried or conditioned state, the liquid rubber as laid down by the rubber-bearing cells has lost its characteristic Brownian movement and is considered to be coagulated.

To be in "prime condition" as to moisture content for the extraction by the usual method of comminuting and/or milling in order to give the better yield of rubber, rather close control of the moisture content is required. "Prime condition" is what is termed the proper condition relative to moisture, and if the percentage moisture is greater or less than the prime condition, the yield of rubber is decreased.

According to the present invention, it has been found that lush shrub, that is, shrub which is green or freshly harvested, or partially dried shrub may be used and a practical recovery up to 95 per cent of the rubber be had. This results in a decrease in milling costs, since it is unnecessary to dry the shrub or use any control as to its storage, and the high recovery also results in economy.

In general, according to the present invention, lush or partially dried shrub having a moisture content of about from 25 to 50 percent is milled in a solution of chemical ingredients which causes coagulation or agglomeration of the individual rubber particles. After a short milling period, substantially all of the colloidal rubber is released from the plant cells and agglomerates to form "worms." After milling, the slurry consists of aqueous plant extracts, the rubber "worms" and plant insolubles or bagasse. The slurry is discharged into a large volume of water, and the "worms" float and may be removed from the liquid phase by skimming or any suitable means.

Purification of the "worms" is then accomplished by washing to remove the adhering liquid and a subsequent scrubbing, if necessary, in a large volume of water, followed by reskimming to remove adhering tissue.

The purified "worms" thus obtained are exceptionally uniform in size, and may be dried in any type conventional dryer. The dried crude rubber when analyzed is of good quality, and is characterized by high nerve in comparison with rubber extracted by the usual process.

The invention is more specifically exhibited by the following example:

TABLE I 20.45 kilos of three-year old plantation lush shrub containing 50 percent moisture were immersed in boiling water for 8 minutes. The shrub was then shaken, whereupon the leaves fell off and were discarded. The defoliated shrub now weighing 10.9 k. was found to contain 49 percent moisture and 12.2 percent rubber hydrocarbon (dry basis), corresponding to approximately 0.672 k. of hydrocarbon in the raw material.

The defoliated shrub was then comminuted in a conventional rotary cutter equipped with ¼ inch screen holes in preparation for milling in a 26" diameter pebble mill.

The cut shrub was charged into a pebble mill along with 21.8 liters of water, 2.2 g. of aluminum sulphate, and 100 ml. of 35 percent hydrochloric acid to make the ratio of water to dry solids approximately five. The contents were milled with a normal charge of stone for 1½ hours, after which the pH was found to be 3.8.

The slurry was discharged into a tank of water and the "worms" were skimmed by hand and superficially washed to remove adhering liquid on the surface of the "worms." They were subsequently brought to a boil in water and scrubbed for 15 minutes in hot water in another 26" ball mill in order to free the "worms" from plant tissue and cork which were mixed with the "worms" upon skimming.

The wet "worms" recovered after scrubbing were reskimmed and dried in a hot air circulating oven and weighed 0.922 k. when dry. The crude dry rubber was analyzed and was found to contain:

| | Percent |
|---|---|
| Moisture (wet basis) | 0.24 |
| Rubber hydrocarbon (dry basis) | 72.0 |
| Acetone solubles (dry basis) | 22.2 |
| Acetone and benzene insolubles (dry basis) | 5.8 |

It will be seen that the rubber hydrocarbon recovered amounted to 0.662 k., which gave an apparent recovery of 98.7 percent of the rubber present in the raw material. However, chemical analysis of the ground plant substance after skimming the "worms" showed that it contained 0.048 k. of rubber hydrocarbon.

Thus, a total of 0.710 k. of hydrocarbon must have been present in the raw material. Accordingly, the corrected or true recovery of hydrocarbon in the form of crude or resinous rubber was 93.2 percent.

The loss of rubber hydrocarbon entailed by parboiling and defoliation varies between 1 percent and 3 percent, depending upon the quantity of leaves on the shrub and the inadvertent loss of small twigs.

The loss of hydrocarbon in the bagasse and in the milling liquid is governed by the time of milling and the efficiency of the coagulant used, as will be evident by the experiments which follow.

In the above example, the shrub was defoliated, but this is not necessary, since the whole shrub may be used. It is preferable, however, to defoliate the shrub, since both the quantity and quality of the crude rubber recovered are bettered as illustrated by the following table showing comparative columns for whole shrub and defoliated shrub.

Table 1

| | Whole Shrub | Defoliated Shrub |
|---|---|---|
| Per cent hydrocarbon recovery | 84.5 | 93.2 |
| Per cent hydrocarbon in rubber | 60.7 | 72.0 |
| Per cent resin in rubber | 28.5 | 22.2 |
| Per cent insolubles in rubber | 10.8 | 5.8 |

The manner of comminuting the shrub prior to its milling in the coagulant medium may be varied. However, for best results, the comminuting machinery should be carefully selected, as illustrated by the results shown in the following table, with comparative columns for shrubs comminuted in a cutter to pass a ¼" screen and comminuted by passing between two tandem crushers only, with the rolls adjusted so that the crushed shrub appeared to be as fine as after passing through the cutter, the experiments being otherwise identical.

Table 2

| | Shrub through ¼" cutter screen | Shrub through two crushers |
|---|---|---|
| Per cent hydrocarbon recovery | 93.2 | 87.8 |
| Per cent hydrocarbon loss in bagasse | 6.8 | 12.2 |

Various factors influence the milling of the shrub in the coagulating medium to produce the rubber "worms." The maximum yield in the presence of the aqueous coagulating medium is obtained at a pH of approximately 2.5 to 5.0.

The coagulating medium should be added at the start of the milling, since if added later, the yield is lowered, this being illustrated by the following table in which the total milling time was 1½ hours, the comparative columns showing the effect when the coagulant is added at the start of the milling as compared to when it is added after 1 hour of milling.

Table 3

| | Coagulant added at start | Coagulant added after 1 hour |
|---|---|---|
| Per cent hydrocarbon recovery | 94.2 | 91.8 |
| Per cent hydrocarbon loss in dispersion | 0.0 | 3.0 |

The influence of the pH adjustment of the coagulating medium on the recovery is shown in the following table, in which the pH is purposely varied by addition of varying quantities of 35 percent of hydrochloric acid to the medium.

Table 4

| | pH upon completion of milling | | |
|---|---|---|---|
| | 3.2 | 3.5 | 4.1 |
| Per cent hydrocarbon recovery | 94.5 | 91.5 | 88.1 |
| Per cent hydrocarbon loss in dispersion | 0.0 | 0.2 | 2.1 |
| Per cent hydrocarbon loss in bagasse | 5.5 | 8.1 | 9.8 |

The coagulating medium may be varied, although from the standpoint of economy and recovery, it is preferred to use strong acids, such as hydrochloric acid or a strong acid with small amounts of trivalent metal salts, or if a weaker acid is used, the acid with the salt.

The following table illustrates the effect of varying the acids showing the comparison between formic acid, acetic acid, and hydrochloric acid in the three columns.

Table 5

| | Coagulant containing only acid | | |
|---|---|---|---|
| | Formic | Acetic | Hydrochloric |
| pH at end of milling | 3.7 | 4.3 | 3.2 |
| Concentration pure acid gs./l | 8.2 | 9.3 | 1.5 |
| Per cent hydrocarbon recovery | 83.7 | 84.2 | 94.5 |
| Per cent hydrocarbon in rubber | 66.5 | 67.1 | 72.1 |
| Per cent resin in rubber | 28.1 | 26.5 | 22.2 |

The effect of the use of the salt with various acids is indicated in the following table in which the concentration of aluminum sulphate is 0.1 g. per l.

Table 6

| | Coagulant composed of acid and aluminum sulphate (0.1 g/l.) | | |
|---|---|---|---|
| | Formic | Acetic | Hydrochloric |
| pH at end of milling | 3.9 | 4.2 | 4.2 |
| Concentration pure acid gs./l | 5.9 | 9.6 | 1.5 |
| Per cent hydrocarbon recovery | 91.0 | 93.3 | 93.2 |

The utilization of an excessive quantity of trivalent metal salt in the coagulating medium is not recommended, as experimental data show that a concentration of 0.1 g. per l. is adequate to insure maximum yields, especially with the use of hydrochloric acid in sufficient quantity.

The following table illustrates the effect of varying quantities of aluminum sulphate as the trivalent metal salt, the concentration of the salt being shown in the first column and the percentage of recovery being shown in the last column, the concentration of acid being kept substantially constant for the four experiments shown.

*Table 7*

| Concentrated aluminum sulphate gs./l. | pH at end of milling | Recovery rubber, per cent |
|---|---|---|
| 2.0 | 4.0 | 91.4 |
| 1.5 | 3.9 | 93.1 |
| 1.0 | 3.4 | 93.2 |
| 0.1 | 4.2 | 93.1 |

In the various rubbers obtained in both Tables 6 and 7, about the same quantity of resin was present.

In the example and experiments given above, the shrub used was lush. The process can also be applied to lush shrub grown without benefit of irrigation which has been partly dried; but in which some of the rubber remains uncoagulated. When lush whole shrub is exposed to the atmosphere outside for approximately 24 hours on a sunny day, the moisture content is decreased from about 50 percent to about 40 percent.

The following table compares the results obtained between column I for fresh or lush defoliated shrub, column II for shrub which has been dried in the sun to 40 percent moisture and then defoliated, column III for lush shrub which has been defoliated and dried in the absence of direct sunlight to 30 percent moisture, and column IV to shrub treated as in column III, except dried to 25% moisture. The results show definite amelioration in crude rubber quality as evidenced by the decrease in resin and increase in hydrocarbon contents.

*Table 8*

|  | I | II | III | IV |
|---|---|---|---|---|
| Per cent moisture at milling | 50 | 40 | 30 | 25 |
| pH after milling | 4.2 | 4.4 | 4.5 | 4.5 |
| Per cent hydrocarbon recovery | 93.2 | 90.9 | 91.2 | 91.7 |
| Per cent hydrocarbon in rubber | 72.0 | 73.9 | 75.4 | 77.4 |
| Per cent resin in rubber | 22.0 | 19.9 | 18.0 | 17.1 |
| Per cent insolubles in rubber | 5.8 | 6.2 | 6.6 | 5.5 |

The various shrubs processed in Table 8 were all from the same field, but were harvested or lifted at the season of the year which normally gives the poorest yield and quality when the rubber is recovered according to conventional processes.

The process may be also applied to lush shrub which has been defoliated and stored in bale form for a considerable time. Under storage conditions, microbial action takes place along with drying, so that any improvement in the quality of the rubber may not be rightly ascribed to the drying per se.

The following table illustrates the effect of storing for various periods of time shown in the four columns with corresponding moisture contents.

*Table 9*

|  | I | II | III | IV |
|---|---|---|---|---|
| Per cent moisture on milling | 49 | 42 | 42 | 28 |
| Storage time in days | 0 | 4 | 6 | 11 |
| pH at end of milling | 4.2 | 4.2 | 4.4 | 4.6 |
| Per cent hydrocarbon recovery | 93.2 | 92.3 | 92.7 | 92.3 |
| Per cent hydrocarbon in rubber | 72.0 | 74.4 | 76.1 | 75.8 |
| Per cent resin in rubber | 22.0 | 18.6 | 17.5 | 16.7 |
| Per cent insolubles in rubber | 5.8 | 7.0 | 6.4 | 7.5 |

Heretofore, it has been considered impractical to extract rubber from extremely young shrub or nursery seedlings by conventional processes, but satisfactorily high yields can be obtained with the present process, as indicated by the following table showing in the two columns the process as applied to seedlings one-year and two-years old.

*Table 10*

|  | Age of seedling ||
|---|---|---|
|  | 1 year | 2 years |
| pH at end of milling | 5.3 | 4.6 |
| Per cent hydrocarbon recovery | 91.6 | 94.1 |
| Per cent hydrocarbon in rubber | 60.0 | 65.6 |
| Per cent resin in rubber | 32.9 | 28.3 |
| Per cent insolubles in rubber | 7.1 | 6.6 |

When "worms" are produced by the preferred method of this invention, either from lush or partially dried shrub, they may be extracted in a solvent like acetone, and a considerable quantity of the resins or acetone soluble ingredients removed from the resinous rubber. Batch extraction using two lots of acetone raises the per cent hydrocarbon to about 85 and reduces the resins to about 6 per cent, and the rubber thus produced is not only easy to dry but possesses considerably more nerve than unextracted rubber.

Tests of the physical properties of the resinous rubber after compounding and vulcanization show that the quality is equal or superior to similar vulcanizates of rubber produced by the conventional processes. When solvent extracted rubber as mentioned above is similarly tested, results show that the vulcanizate is superior to those of resinous rubbers produced by known processes, and that such rubber should be well suited for tire building. This has not been true in general of solvent extracted rubber obtained from shrub harvested and excessively dried before processing, and it is therefore concluded that processing lush shrub gives a wet "worm" containing rubber hydrocarbon which has not been degraded by excessive drying or the action of sunlight.

Having thus described the invention, what is claimed is:

1. A process of recovering rubber from guayule shrub having a moisture content of about from 25 to 50 percent comprising comminuting the shrub, milling the comminuted shrub in an aqueous coagulant medium adjusted to a pH of from 2.5 to 5.0, and floating the rubber "worms" thus formed and removing them from the liquid phase.

2. The process of recovering rubber from guayule shrub comprising defoliating lush guayule shrub, comminuting the defoliated shrub, milling the comminuted shrub in an aqueous hydrochloric acid coagulant medium adjusted to a pH of from 2.5 to 5.0, floating the rubber "worms" thus formed in water, removing the rubber "worms," and drying the removed "worms."

3. The process of recovering rubber from guayule shrub comprising defoliating lush guayule shrub, comminuting the defoliated shrub, milling the comminuted shrub in an aqueous hydrochloric acid coagulant medium adjusted to a pH of from 2.5 to 5.0, floating the rubber "worms" thus formed in water, removing the rubber "worms," extracting the "worms" to remove resin, and drying the extracted "worms."

EDWIN P. JONES.

REFERENCES CITED

The following references are of record in the file of this patent:

UNITED STATES PATENTS

| Number | Name | Date |
|---|---|---|
| 1,695,676 | Yeandle | Dec. 18, 1928 |
| 2,373,689 | Kenda | Apr. 17, 1945 |

OTHER REFERENCES

"India Rubber World," vol. 109 of 1944, pp. 475, 476, 477.